March 23, 1965  R. W. GRACE, JR  3,174,615

OVERHEAD CARRIER-TYPE MATERIAL HANDLING CONVEYOR

Filed Oct. 30, 1961  3 Sheets-Sheet 1

INVENTOR.
ROBERT W GRACE, JR.
BY Williams, David,
Hoffmann & Yount
ATTORNEYS

INVENTOR.
ROBERT W. GRACE, JR.
BY Williams, David,
Hoffmann & Yount
ATTORNEYS

March 23, 1965  R. W. GRACE, JR  3,174,615
OVERHEAD CARRIER-TYPE MATERIAL HANDLING CONVEYOR
Filed Oct. 30, 1961  3 Sheets-Sheet 3
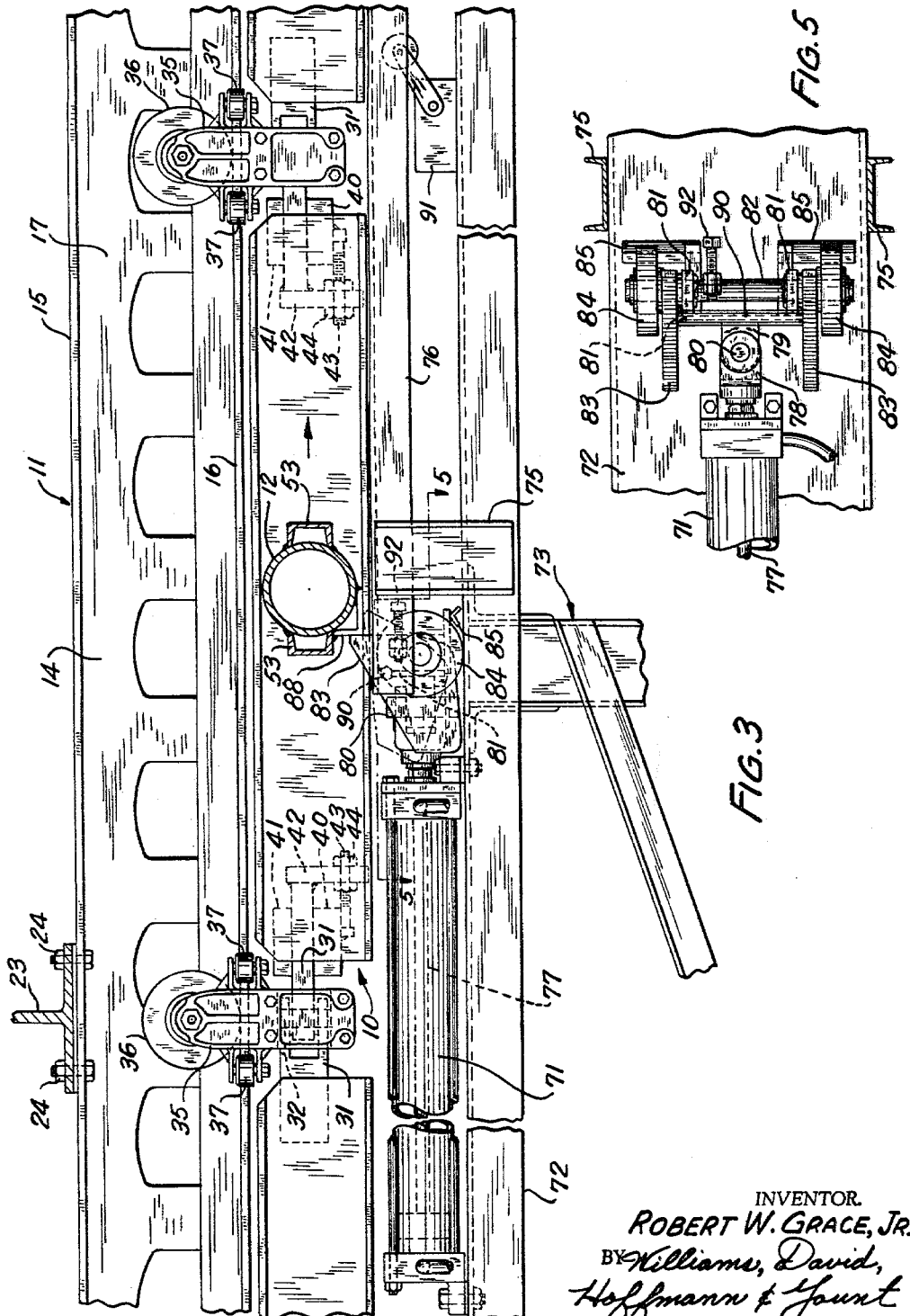
INVENTOR.
ROBERT W. GRACE, JR.
BY Williams, David,
Hoffmann & Yount
ATTORNEYS

United States Patent Office 3,174,615
Patented Mar. 23, 1965

3,174,615
OVERHEAD CARRIER-TYPE MATERIAL HANDLING CONVEYOR
Robert W. Grace, Jr., Kalamazoo, Mich., assignor to The Cleveland Crane & Engineering Company, Wickliffe, Ohio, a corporation of Ohio
Filed Oct. 30, 1961, Ser. No. 148,583
2 Claims. (Cl. 198—131)

The present invention relates to material handling devices and particularly to conveyors onto which material is deposited and held until it is desired to be used, at which time the conveyor is actuated to move the material to an unloading station and the material is taken from the conveyor at that station.

The principal object of the present invention is the provision of a new and improved material handling device, of the above noted type, which includes a plurality of carriers mounted for movement along an overhead monorail track, each of the carriers being adapted to receive a load of material cantilevered out from the track on which the carriers move.

A further object of the present invention is the provision of a new and improved material handling device of the above noted type wherein the conveyor is adapted to receive heavy loads of material which may be placed on and removed from the conveyor with relative ease.

A more specific object of the present invention is the provision of a material handling device having a plurality of carriers connected together for movement along a closed or continuous monorail track, means secured to each carrier and extending substantially horizontally therefrom in two opposite directions substantially perpendicular to the movement of the carrier, means mounted on one end of the horizontally extending means for supporting material thereon, and means on the opposite end of the horizontally extending means for resisting the moment of a force created by the load of material located on the first mentioned end.

A further object of the present invention is the provision of a new and improved material handling device, of the last referred to type, wherein the carriers are moved along the rail by a reciprocating power means which engages an abutment on each of the carriers to move the carriers along the rail.

Further objects and advantages of the present invention will be apparent to those skilled in the art to which the invention relates from the following detailed description of a preferred embodiment of the invention, made with reference to the accompanying drawings which form a part of this specification, and in which FIG. 1 is a schematic plan view of a material handling device embodying the present invention;

FIG. 3 is a vertical sectional view taken approximately on the section line 3—3 of FIGS. 1 and 2;

FIG. 4 is a sectional view taken approximately on the section line 4—4 of FIG. 2; and FIG. 5 is a sectional view taken approximately on the section line 5—5 of FIG. 3.

Figure 1:
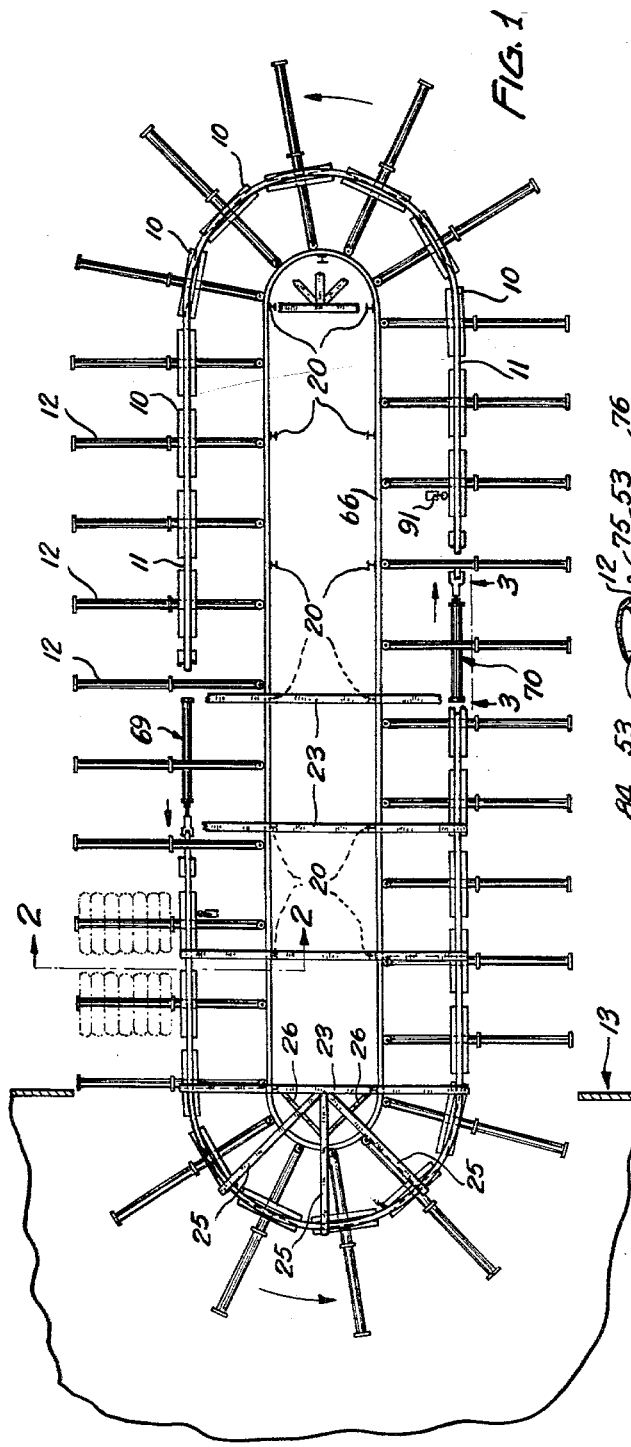

The preferred embodiment of the present invention illustrated in the drawings comprises a plurality of carriers 10 supported for movement along an overhead monorail type continuous track 11. Each of the carriers is provided with a load carrying means 12 which extends substantially horizontally from each of the carriers and perpendicular to the direction of movement of the carriers. A portion of the track 11 extends into the interior of a building 13, while another portion thereof in the embodiment illustrated extends into a storage yard outside of the building 13. The material handled by the present invention is deposited on and removed from the load carrying means 12 in a suitable manner. The loading and unloading stations may be located at any convenient point along the track 11. In the embodiment shown the loading takes place in the area outside the building 13 and unloading takes place in the building 12. Once loaded the carriers are moved around the continuous track 11 and into the building when the load on a load carrying means 12 is to be used in the building. The carriers are connected together and are moved simultaneously along the track 11 by a suitable power means.

The monorail 14 on which the carriers 10 move is of conventional construction and comprises an upper flange 15 and a lower carrier engaging flange 16 with a web plate 17 connecting the two flanges. The monorail is suitably mounted by means of a plurality of vertically extending support beams 20 which are bolted to a suitable foundation 21. The upper end of the vertical beams 20 has a cap plate 22 secured thereon. As is apparent from FIG. 1, the vertical beams 20 are symmetrically positioned around the continuous track 11. Beams 23 extend horizontally above the rail 14 and transverse to it and each beam 23 is supported by two separate vertical beams 20. FIG. 1 illustrates the manner in which the beams 23 are supported but illustrates only a few of these beams. The rail 14 is secured by means of bolts 24 which extend through the flange 15 of the rail and into the beam 23 at the opposite extremities of the beams 23. The curved portions of the rail are supported by identical beam arrangements, one of which is illustrated on the left side of FIG. 1 and includes three beam members 25 which extend radially from a central portion of the beam 23 which is located at the extreme left side of the monorail loop or track 11. Suitable support beams 26 are utilized to support beams 25. The rail 14 is bolted to the beams 25 in the manner in which it is bolted to beams 23.

Each of the carriers 10 which move along the rail of the track 11 consists of a pair of channel members 30 which extend in parallel relation and are spaced apart a small distance. The channel members 30 are suitably secured together by means of blocks 31 to which the channel members are welded and which extend between the channel members 30 and slightly beyond the members 30 at each end of the channel members. The blocks 31 on each alternate carrier are female members which are adapted to receive block 31 on the adjacent carriers, which blocks are male members. This can be seen clearly in FIG. 3, wherein the block member 31 on the carrier located at the left of FIG. 3 is a female member and the block 31 on the carrier adjacent thereto is a male member adapted to be received by the female member. These male and female blocks have aligned openings therein and are pivotally secured together by a pin 32, which permits the carriers to pivot with respect to each other. It is noted that approximately 30 carriers are arranged in a closed loop around the continuous track 11 and 15 of these carriers have female ends, while 14 are provided with male ends and one carrier is provided with an adjustable male end to be described below. It is apparent, of course, that any number of carriers may be used as desired.

Wheel frames 35 are suitably supported in a conventional manner on the pins 32 and carry a pair of carrier supporting wheels 36 which engage the flange 16 of the rail on opposite sides of the web plate 17 thereof. Each wheel frame 35 is provided with four additional wheels 37, two on each side of the rail 14, which rotate on a vertical axis and engage the edge of flange 16 to assist in guiding the carriers along the rail 14.

The aforementioned carrier which is provided with the adjustable male ends is shown in FIG. 3. The male ends 31 on this carrier are slidably mounted between spaced blocks 40 and 41, which are suitably welded to the channel members 30. The portion of the male ends 31 which are located between the spaced channel members 30 have vertically extending plates 42 welded thereto. A bolt 43 is welded to the bottom of the lower plate 40 and extends through an opening in the vertically extending plate 42. Two nuts 44 are threaded onto the bolt 43. One nut is located on each side of the plate 42. It should be readily understood that the nuts 44 may be moved on the bolt 40 so that the plate 42 and the end block 31 secured thereto will be moved in the direction of movement of the carrier. Since the adjustable end block 31 is secured by means of the pin 32 to the adjacent female end block on the next carrier, movement of the male end block 31 will cause the carrier adjacent thereto to move either toward or away from the carrier having the adjustable end block. Moreover, the adjustable end blocks can be moved into proper alignment with the end blocks on the adjacent carrier by this mechanism. It should be apparent that this adjustment permits the proper assembly of the carriers 10 so that they may form a closed loop around the continuous track 11.

The channel members 30 of each carrier are provided with an opening in substantially the center thereof through which the load carrying and supporting means 12 extends. This load supporting means 12 preferably comprises an elongated pipe which includes a first portion 51, which comprises a means extending substantially horizontally from the carriers in a direction away from the vertically extending support beams 20 outside the loop 11 and a second portion 52 which comprises a means which extends substantially horizontally from the carrier and perpendicular to the direction of movement of a carrier toward the support beams 20 and inside the continuous track 11. A pair of channel members 53 are mounted on opposite sides of the carrier 10 and extend on opposite sides of the portions 51 and 52, respectively, of the pipe 12. These channel members 53 are welded to the pipe 12 and to the channel members 30 of the carriers 10 and assist in supporting the pipe 12.

The portion 51 of the pipe 12 is a load supporting means and may be of any suitable nature depending upon the material being handled. Preferably, it supports annular bodies having openings therein such as coils of wire and comprises a plate 54 mounted on the end thereof and extending vertically above the pipe 12. A second plate 55 is spaced from plate 54 and is also mounted on the portion 51 of the pipe 12 and is welded to the pair of support channels 53 which extend along the portion 51 of the pipe 12. The coil of wire is placed on the pipe 12 with the pipe extending through the opening in the coil and the plates 54, 55 between which the coil is placed are provided to maintain the coil of wire on the pipe 12. This positioning of a coil of wire on the pipe 12 can be readily accomplished by a fork lift truck. Such a truck can with equal ease remove the coils from the pipes 12.

Figure 2:
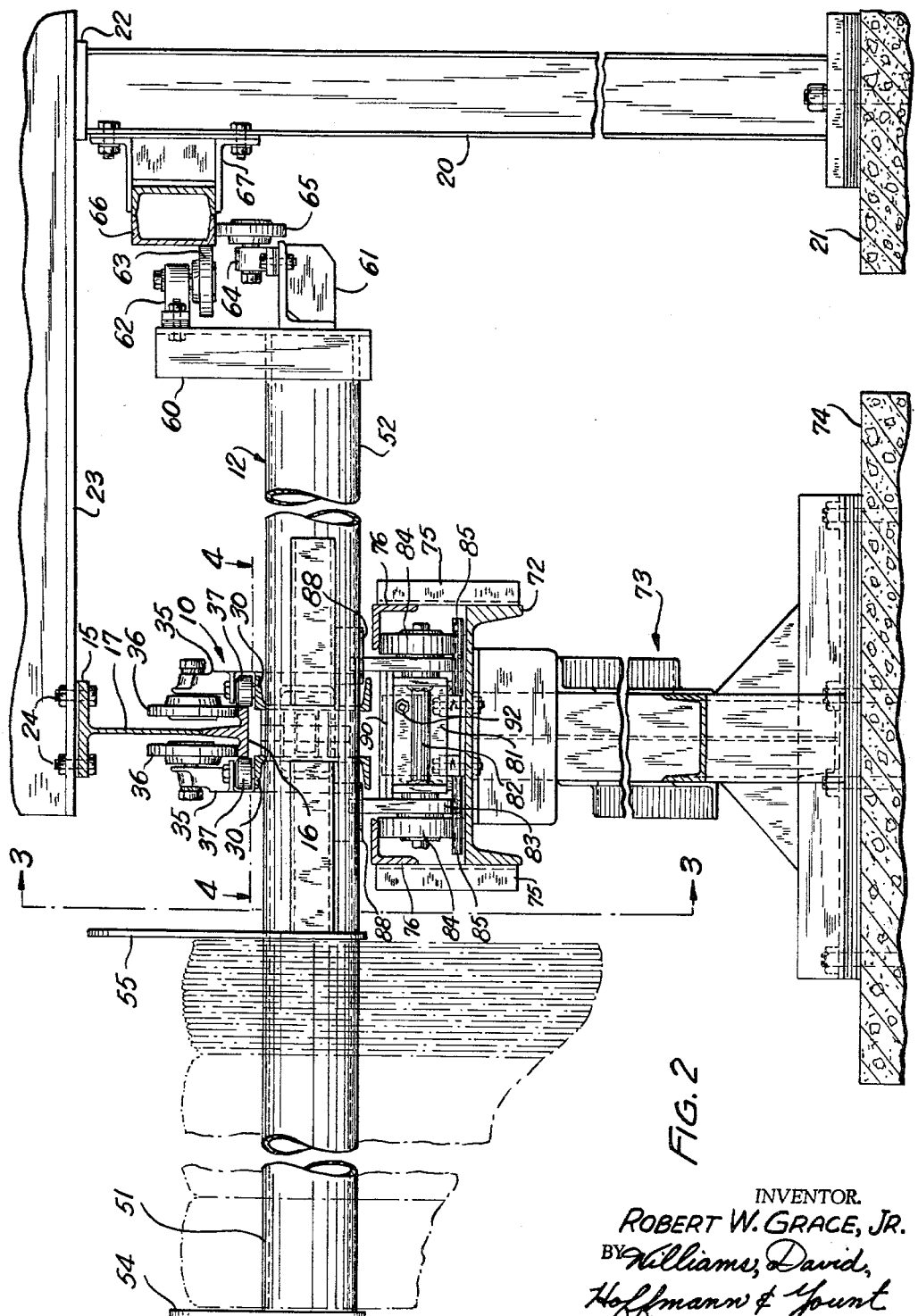
FIG. 2 is a sectional view taken approximately on the section line 2—2 of FIG. 1.

It should be noted that by such an arrangement heavy loads of material are cantilevered out from the rail 11. These loads can weigh as much as 3500 pounds and the portion 51 of pipe 12 which supports this weight may be greater than 7 feet long. This creates an extremely great moment of force which tends to rotate the pipe 12 in a counterclockwise direction, as viewed in FIG. 2, about the carriers 10, that is a direction which tends to raise the end of the pipe 12 opposite the end supporting the load. Suitable means for aiding the resistance of this force is mounted on the end of the portion 52 of the pipe 12 and includes a vertically extending channel member 60 from which a support frame 61 extends. A first roller frame 62 is suitably secured to the channel member 60 and carries a roller 63 which is rotatable about a vertical axis. The support mechanism 61 carries a second roller frame 64 which in turn has a roller 65 mounted therein for rotation about a horizontal axis. The rollers 63 and 65 engage vertical and horizontal surfaces of a stationary support channel member 66 which is suitably secured to the vertical supports 20 by means of brackets 67 which are suitably bolted to the support 20 and to which the support rail 66 and the rail 14 is constant and does FIG. 1 that the support rail 66 is substantially coextensive with the continuous track 11 and the space between the support rail 66 and the rail 14 is constant and does not vary.

Power means is provided for moving the carriers about the track. This power means may consist of any suitable device, but preferably comprises a pair of identical cylinder structures 69, 70, which operate in unison at spaced point along the rail to move the carriers therealong. Since the structures 69, 70 are identical only cylinder structure 70 will be described. It includes a hydraulic or pneumatic cylinder 71 which is suitably bolted to a guide channel 72. The guide channel 72 is mounted directly beneath the rail 11 by means of suitable support structure 73, which is bolted to a foundation 74. Suitable support channels 75 extend vertically from the guide channel 72 and guide members 76 are welded thereto and extend parallel to the guide channel 72 and are spaced therefrom, thereby forming a guide passageway for a purpose to be described below.

The cylinder 71 is provided with a piston rod 77 having an end which supports a female yoke member 78. The member 78 receives a male block 79 and a pin 80 extends vertically through aligned openings in the member 78 and the block 79. A U-shaped member 81 is welded to the block 79 with the legs on the U-shaped member extending in a direction away from the cylinder 71. The legs of the U-shaped member 81 have aligned openings therein through which a shaft 82 extends and the shaft 82 is welded in such a position.

A pair of pusher plates 83 are mounted for free rotation on the shaft 82 and are positioned outside the leg portions of the U-shaped member 81 and are biased into their full line positon in FIG. 3 by the distribution of their weight about shaft 82. Rollers 84 are mounted on the extreme end portions of the shaft 82. The rollers 84 engage the guide channel 72 and the channel member 76 and move in the passageway provided thereby. Suitable ice scrappers 85 are mounted for movement with the rollers 84 and are positioned to scrape ice or snow or any foreign matter from the portion of the guide channel 72 on which the rollers 84 are to move.

The pair of pusher plates 83 are adapted to cooperate with suitable abutment means secured on each carrier and which preferably comprises a pair of abutments 88 which are welded to the pipe 12. A bar 90 extends between the pusher plates 83, is welded thereto, and has a hexagonal cross section. When the pusher plates 83 are in engagement with abutments 88, a flat portion of the bar 90 engages the top portion of the base plate of the U-shaped member, as best seen in FIG. 3. This cooperation between the base plate and bar 90 prevents the pusher plates 83, which are freely pivotal on shaft 82, from pivoting to such an extent that they can pass beneath abutments 88.

The cylinders 71 are preferably manually actuated, but could be used in an automated system and actuated upon the operation of another mechanism. It should be apparent, however, from the above description that upon actuation of the hydraulic cylinder structure 71 the pusher plates 83 will engage the abutments 88 and thereby push the carriers in the direction of extension of the piston rod. A switch 91 is suitably secured to the guide channel 72 and upon actuation of the hydraulic cylinder 71 is tripped by a switch tripper 92 which is welded to the shaft 82 and moves with pusher plates 83. The switch tripper 92 is an extensible bolt which engages the actuating member of the switch 91. The switch 91 functions upon actuation to operate suitable valve mechanism for directing hydraulic fluid to the front portion of the hydraulic cylinder 71 to effect movement of the pusher members 83 in a direction opposite the direction of movement of the carriers 10. The switch 91 may be positioned any suitable distance from the cylinder 71 to limit the length of the stroke of the cylinder 71 as desired. Preferably, the stroke length is slightly greater than the distance between the abutments 88 on adjacent carriers. Upon actuation of switch 91 and return movement of the pusher plates 83, the portion of the pipe 12, designated 94 in FIG. 3, engages the pusher plates 83 and causes the plates 83 to pivot about shaft 82 into the dotted line position shown in FIG. 3, thereby raising bar 90 from the top edge of the base plate of the U-shaped member 81. The weight of the pusher plates 83 is distributed about the shaft 82 in a manner that when the pusher plates 83 pass beneath pipe 12 on the return stroke they will pivot into the full line position shown in FIG. 3 and thereby be in position for engaging the abutments 88 on the next carrier.

While the switch 91 is described as reversing the movement of the pusher plates 83, it is to be understood that the switch 91 may trigger the actuation of other mechanism which, at the completion of its operation, actuates the return of the pusher plates 83. For example, such mechanism may include doors into the interior of the building 13. Switch 91 may trigger the closing of the doors which upon closing actuate the return movement of the pusher plates.

Moreover, it should be apparent that suitable treating mechanisms may be provided for acting upon the material being handled in some way while the material is supported by the pipes 12. For example, suitable washing and drying stalls may be supplied for cleaning the coils of wire prior to their entry into the building 13.

While the present invention has been shown and described as embodied in a storage conveyor for handling and storing coils of wire in a storage yard for movement into the interior of a plant when desired, it is to be understood that the present invention is susceptible of use in many different environments and for handling many different items. Moreover, the preferred embodiment of the present invention has been described with considerable detail, but it is to be understood, of course, that the invention is not limited to the specific construction shown and that it is my intention to hereby cover all adaptations, modifications, and uses thereof which come within the scope of the appended claims.

Having thus described my invention, I claim:

1. A material handling device comprising a stationary overhead continuous monorail track, means suspending said track from overhead, a plurality of carriers each embodying a pair of members arranged in spaced parallel relation to one another and to said track, a connecting member interposed between said pair of members and arranged to project beyond the ends of each carrier, certain of said connecting members constituting sockets for receiving a connecting member of an adjacent pair of members, means for pivotally securing said connecting members to one another to define a continuous loop of carriers, wheels engaging said track and connected to said carriers for supporting said carriers for movement below and along said track, each of the plurality of said carriers comprising means extending generally horizontally therefrom in one direction substantially perpendicular to the direction of movement of said carriers along said track and adapted to have material to be handled supported thereon which when so supported creates a movement of force that tends to cause rotation of said carriers about said track in one direction, second means on each of said plurality of said carriers, stationary abutment means paralleling said track and engaged by said second means for limiting rotation of said carriers about said track in said one direction by said movement of force and maintaining said second means in said generally horizontal position, and power means for moving said carriers along said track.

2. A material handling device comprising a stationary overhead continuous monorail track, means suspending said track from overhead, a plurality of carriers each embodying a pair of members arranged in spaced parallel relation to one another and to said track, a connecting member interposed between said pair of members and arranged to project beyond the ends of each carrier, certain of said connecting members constituting sockets for receiving a connecting member of an adjacent pair of members, means for pivotally securing said connecting members to one another to define a continuous loop of carriers, wheels engaging said track and supporting said carriers for movement below and along said track, driving means for said carriers including an assembly mounted adjacent to and below said track for movement parallel with said track, a reciprocating-type fluid actuated motor mounted parallel with and adjacent to but below said track for reciprocating said assembly, said assembly comprising a retractable member adapted to engage said carriers upon movement of said assembly in one direction to move said carriers about said track, each of the plurality of said carriers comprising means extending generally horizontally therefrom in one direction substantially perpendicular to the direction of movement of said carriers about said track and adapted to have material to be handled supported thereon which when so supported creates a movement of force that tends to cause rotation of said carriers about said track in one direction, second means on each of said plurality of said carriers, and stationary abutment means paralleling said track and engaged by said second means for limiting rotation of said carriers about said track in said one direction by said movement of force and maintaining said second means in said generally horizontal position.

References Cited by the Examiner
UNITED STATES PATENTS

| | | | |
|---|---|---|---|
| 1,413,891 | 4/22 | Beech | 104—91 |
| 2,503,803 | 4/50 | Cremer et al. | 198—131 X |
| 2,529,777 | 11/50 | McInnis | 198—135 |
| 2,830,694 | 4/58 | Zebarth | 198—177 |

SAMUEL F. COLEMAN, *Primary Examiner.*

WILLIAM B. LA BORDE, *Examiner.*